United States Patent [19]
Umeki et al.

[11] Patent Number: 6,078,329
[45] Date of Patent: *Jun. 20, 2000

[54] VIRTUAL OBJECT DISPLAY APPARATUS AND METHOD EMPLOYING VIEWPOINT UPDATING FOR REALISTIC MOVEMENT DISPLAY IN VIRTUAL REALITY

[75] Inventors: Naoko Umeki; Miwako Doi, both of Kanagawa-ken, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/720,069

[22] Filed: Sep. 27, 1996

[30] Foreign Application Priority Data

Sep. 28, 1995 [JP] Japan .................................. 7-250403
Mar. 12, 1996 [JP] Japan .................................. 8-054301

[51] Int. Cl.⁷ .................................................. G06T 15/00
[52] U.S. Cl. .......................................... 345/419; 345/427
[58] Field of Search ................................... 345/419, 418, 345/473, 357, 433, 427

[56] References Cited

U.S. PATENT DOCUMENTS

| | | | |
|---|---|---|---|
| 4,807,202 | 2/1989 | Cherri et al. | 367/129 |
| 5,276,785 | 1/1994 | Mackinlay et al. | 345/427 |
| 5,325,472 | 6/1994 | Horiuchi et al. | 345/427 |
| 5,566,280 | 10/1996 | Fukui et al. | 345/419 |
| 5,577,175 | 11/1996 | Naka et al. | 345/427 |
| 5,588,139 | 12/1996 | Lanier et al. | 395/500 |
| 5,594,856 | 1/1997 | Girard | 345/473 |
| 5,604,848 | 2/1997 | Harada et al. | 345/419 |
| 5,696,892 | 12/1997 | Redmann et al. | 345/425 |
| 5,704,837 | 1/1998 | Iwasaki et al. | 463/38 |
| 5,710,875 | 1/1998 | Harashima et al. | 345/419 |
| 5,734,805 | 3/1998 | Isensee et al. | 345/419 |
| 5,754,189 | 5/1998 | Doi et al. | 345/473 |
| 5,767,861 | 6/1998 | Kimura | 345/473 |
| 5,790,950 | 8/1998 | Suzuki et al. | 435/427 |
| 5,830,066 | 11/1998 | Goden et al. | 463/33 |
| 5,883,628 | 3/1999 | Mullaly et al. | 345/355 |
| 5,894,307 | 4/1999 | Ohno et al. | 34/355 |
| 5,907,328 | 5/1999 | Brush, II et al. | 345/358 |
| 5,926,179 | 7/1999 | Matsuda et al. | 345/355 |

OTHER PUBLICATIONS

Hagsand, O.; Interactive Multiuser VEs in the DIVE System; IEEE Multimedia, vol. 3, iss. 1, pp. 30–39, Spr. 1996.

Mel Slater et al., "Taking Steps: The Influence of a Walking Technique on Presence in Virtual Reality", ACM Transactions on Computer–Human Interaction, vol. 2, No. 3, pp. 201–219, Sep. 1995.

"WebSpace Navigator 1.1, WebFORCE Software Environment"; WebSpace Navigator 1.1 Data Sheet—Microsoft; URL http://webspace.sgi.com/WebSpace/index.html; pp. 1–4; 1996.

"The Virtual Reality Modeling Language", VRML 1.0 Specification—Microsoft; URL http://vrml.wired.com/vrml.tech/vrml/10–3.html; pp. 1/30–5/30; 1996.

*Primary Examiner*—Mark K. Zimmerman
*Assistant Examiner*—Albert K. Lee
*Attorney, Agent, or Firm*—Finnegan, Henderson, Farabow, Garrett & Dunner, L.L.P.

[57] ABSTRACT

A virtual object display apparatus displays an object moved in three-dimensional virtual space. A key frame memory section previously stores move data of each part of the object by unit of action of the object's movement in three-dimensional virtual space. A swing calculation section calculates the change of a basis point of the object by unit of action according to the move data of each part of the object. A display position set section calculates the change of display position corresponding to the change of the basis point in three-dimensional virtual space by unit of action. A display section displays the object movement in three-dimensional virtual space according to the display position by unit of action.

20 Claims, 19 Drawing Sheets

| OBJECT NAME | ID NUMBER | CENTER COORDINATE | BOUNDING BOX | POINTER TO SHAPE DATA |
|---|---|---|---|---|
| CONSOLE | 120 | (X0, Y0, Z0) | (X01, Y01, Z01) (X02, Y02, Z02)<br>(X03, Y03, Z03) (X04, Y04, Z04)<br>(X05, Y05, Z05) (X06, Y06, Z06)<br>(X07, Y07, Z07) (X08, Y08, Z08) | P0 |
| DOOR | 130 | (X1, Y1, Z1) | (X11, Y11, Z11) (X12, Y12, Z12)<br>(X13, Y13, Z13) (X14, Y14, Z14)<br>(X15, Y15, Z15) (X16, Y16, Z16)<br>(X17, Y17, Z17) (X18, Y18, Z18) | P1 |
| SPOT PANEL | 135 | (X2, Y2, Z2) | (X21, Y21, Z21) (X22, Y22, Z22)<br>(X23, Y23, Z23) (X24, Y24, Z24)<br>(X25, Y25, Z25) (X26, Y26, Z26)<br>(X27, Y27, Z27) (X28, Y28, Z28) | P2 |
| ⋮ | ⋮ | ⋮ | ⋮ | ⋮ |

*FIG. 4*

| ID NUMBER | 0 | 1 | 2 | .... |
|---|---|---|---|---|
| ID NUMBER OF SHAPE DATA | 120 | 130 | 135 | .... |
| POSITION COORDINATE | (X0, Y0, Z0) | (X1, Y1, Z1) | (X2, Y2, Z2) | .... |
| ROTATION ANGLE | (90,0,0) | (0,0,0) | (90,0,0) | .... |

*FIG. 5*

| KIND OF ACTION | NUMBER OF SAMPLES | SAMPLE NUMBER | PART | SET VALUE |
|---|---|---|---|---|
| WALK | 7 | 0 | Rleg | 0.0 0.0 0.0 |
| | | | Rlowleg | 0.0 0.0 0.0 |
| | | | Lleg | 0.0 0.0 0.0 |
| | | | Llowleg | 0.0 0.0 0.0 |
| | | | Rarm | 0.0 0.0 0.0 |
| | | | Larm | 0.0 0.0 0.0 |
| | | 1 | Rleg | -20.0 0.0 0.0 |
| | | | Rlowleg | 10.0 0.0 0.0 |
| | | | Lleg | 20.0 0.0 0.0 |
| | | | Llowleg | 0.0 0.0 0.0 |
| | | | Rarm | 20.0 0.0 0.0 |
| | | | Larm | -20. 0 0.0 0.0 |
| | | 2 | Rleg | 0.0 0.0 0.0 |
| | | | Rlowleg | 0.0 0.0 0.0 |
| | | | Lleg | 0.0 0.0 0.0 |
| | | | Llowleg | 20.0 0.0 0.0 |
| | | | Rarm | 0.0 0.0 0.0 |
| | | | Larm | 0.0 0.0 0.0 |
| | | 3 | Rleg | 20.0 0.0 0.0 |
| | | | Rlowleg | 0.0 0.0 0.0 |
| | | | Lleg | -20.0 0.0 0.0 |
| | | | Llowleg | 10.0 0.0 0.0 |
| | | | Rarm | -20.0 0.0 0.0 |
| | | | Larm | 20.0 0.0 0.0 |
| | | 4 | Rleg | 0.0 0.0 0.0 |
| | | | Rlowleg | 20.0 0.0 0.0 |
| | | | Lleg | 0.0 0.0 0.0 |
| | | | Llowleg | 0.0 0.0 0.0 |
| | | | Rarm | 0.0 0.0 0.0 |
| | | | Larm | 0.0 0.0 0.0 |
| | | 5 | Rleg | 0.0 0.0 0.0 |
| | | | Rlowleg | 0.0 0.0 0.0 |
| | | | Lleg | 0.0 0.0 0.0 |
| | | | Llowleg | 0.0 0.0 0.0 |
| | | | Rarm | 0.0 0.0 0.0 |
| | | | Larm | 0.0 0.0 0.0 |
| | | 6 | Rleg | 0.0 0.0 0.0 |
| | | | Rlowleg | 0.0 0.0 0.0 |
| | | | Lleg | 0.0 0.0 0.0 |
| | | | Llowleg | 0.0 0.0 0.0 |
| | | | Rarm | 0.0 0.0 0.0 |
| | | | Larm | 0.0 0.0 0.0 |

*FIG. 6*

VIRTUAL OBJECT DISPLAY APPARATUS AND METHOD EMPLOYING VIEWPOINT UPDATING FOR REALISTIC MOVEMENT DISPLAY IN VIRTUAL REALITY

BACKGROUND OF THE INVENTION

1. Field of the Invention

The present invention relates to a virtual object display apparatus and method for displaying a virtual object moved in three-dimensional virtual space using computer graphics.

2. Description of the Related Art

Conventionally, in the display of a human model walking in three-dimensional virtual space, the human model seems to smoothly move straight toward a target. In addition to this, the human model is not displayed on screen because the viewpoint of the human model is the same as the camera view point. FIG. 1 shows an example of a display screen which is displayed from the viewpoint of the human model. In this case, while the human models is walking, the walking direction is the same as the view direction. Alternatively, the viewpoint can move to the left or right in the virtual space but the view direction does not change. However, for straight and smooth movement, a feeling of the walking action of the human model is not provided by the content of the display screen. Additionally, the human model itself is not displayed on the screen. Therefore, it is difficult for a user to recognize the scale of the virtual space (room) if there are only few objects in the virtual room of the display. In short, the user cannot clearly perceive the distance moved toward a target in the virtual room. When displaying movement along a walking direction that is the same as the view direction, or when moving to the left or right in a virtual room, it is impossible to display the human model's walking while the viewpoint of the human model is directed toward surrounding objects.

Recently, a three dimensional viewer (3D Viewer) for the World Wide Web, i.e., webspace, has been used to display the three-dimensional virtual space. FIG. 2 shows an example of the display screen of the 3D Viewer. As shown in FIG. 2, a control object such as a handle is additionally displayed in the virtual space. The user operates the handle on the display screen using a mouse. In this case, the handle is rotated on the display screen according to operation of the mouse, and the content of the display screen is changed according to direction in which the handle is turned. In short, the user can view the virtual space in a direction corresponding to his operation of the handle on the display screen. However, the human model is not displayed on the screen. Therefore, the user cannot have a feeling of identity with the human model moving in virtual space.

As described above, using conventional techniques the user cannot have the feeling of being in the virtual space because the virtual space on the display screen is only changed to provide a view straight along the direction of movement. It is not possible having to display the viewpoint of the human model walking while he directs his viewpoint torward surrounding objects in the virtual space because conventionally, the walking direction of the human model is the same as the view direction.

SUMMARY OF THE INVENTION

It is an object of the present invention to provide a virtual object display apparatus and method to enable a user to have a feeling of presence similar to the feeling in actual space by watching virtual space on the display screen.

According to the present invention, there is provided virtual object display apparatus for displaying movement of an object having parts in three-dimensional virtual space, comprising: key frame memory means for storing movement data of each part of the object corresponding to a type of action representing movement in the three-dimensional virtual space; swing calculation means for calculating a next basis point of the object for the action according to a present basis point and the movement data of each part of the object; display position set means for calculating a display position corresponding to the next basis point in the three-dimensional virtual space for the action; and display means for displaying the object movement in three-dimensional virtual space according to the display position for the action.

Further in accordance with the present invention, there is virtual object display apparatus for displaying a virtual object in three-dimensional virtual space, comprising: viewed object memory means for storing object information for each object viewable from positions in the three-dimensional virtual space; position calculation means for calculating a display position relative to a predetermined movement direction; viewed object selection means for selecting the object to be viewed from the calculated display position according to the object information stored in said viewed object memory means; and display means for displaying the selected object in the three-dimensional virtual space according to the display position.

Further in accordance with the present invention, there is a virtual object display apparatus for displaying an object located in three-dimensional virtual space, comprising: input means for inputting information including an input rotation angle and a rotation direction of the object; position calculation means for calculating a view direction and a viewpoint of the object according to a present display position and a present reference point; rotation angle calculation means for calculating an object rotation angle of the object according to the information inputted by said input means, and for calculating a next display position and a next reference point according to the object rotation angle, the view point and the view direction; and display means for displaying the object located in the three-dimensional virtual space according to the next display position and the next reference point.

Further in accordance with the present invention, there is a virtual object display method for displaying movement of an object in three dimensional virtual space, comprising the steps of: storing movement data of each part of the object corresponding to a type of action representing movent in three-dimensional virtual space; calculating a next basis point of the object for the action according to a present basis point and the movement data of each part of the object; calculating a display position corresponding to the next basis point in the three-dimensional virtual space for the action; and displaying the object movement in three-dimensional virtual space according to the display position for the action.

Further in accordance with the present invention, there is a virtual object display method for a displaying virtual object in three-dimensional virtual space, comprising the steps of: storing object information for each object viewable from positions in the three-dimensional virtual space; calculating a display position relative to a predetermined movement direction; selecting the object to be viewed from the display position according to the object information; and displaying the selected object in the three-dimensional virtual space according to the display position.

Further in accordance with the present invention, there is a virtual object display method for displaying an object located in three-dimensional virtual space, comprising the steps of: inputting information including an input rotation angle and a rotation direction of the object; calculating a view direction and a viewpoint of the object according to a present display position and a present reference point; calculating an object rotation angle of the object according to the inputted information; calculating a next display position and a next reference point according to the objec rotation angle, the viewpoint and the view direction; and displaying the object located in the three-dimensional virtual space according to the next display position and the next reference point.

Further in accordance with the present invention, there is a computer-readable memory for storing a display method for displaying movement of an object in three-dimensional virtual space, comprising: instruction means for causing a computer to store movement data of each part of the object corresponding to a type of action representing movement in three-dimensional virtual space; instruction means for causing a computer to calculate a next basis point of the object for the action according to a present basis point and the movement data of each part of the object; instruction means for causing a computer to calculate a display position corresponding to the next basis point in the three-dimensional virtual space for the action; and instruction means for causing a computer to display the object movement in the three-dimensional virtual space according to the display position for the action.

Further in accordance with the present invention, there is a computer-readable memory for storing a display method for displaying a virtual object in three-dimensional virtual space, comprising: instruction means for causing a computer to store object information for each object viewable from positions in the three-dimensional virtual space; instruction means for causing a computer to calculate a display position relative to a predetermined movement direction; instruction means for causing a computer to select the object to be viewed from the display position according to the object information; and instruction means for causing a computer to display the selected object in the three-dimensional virtual space according to the display position.

Further in accordance with the present invention, there is a computer-readable memory for storing a display method for displaying an object located in three-dimensional virtual space, comprising: instruction means for causing a computer to input information including an input rotation angle and a rotation direction of the object;instruction means for causing a computer to calculate a view direction and a viewpoint of the object according to a present display position and a present reference point; instruction means for causing a computer to calculate an object rotation angle of the object according to the inputted information; instruction means for causing a computer to calculate a next display position and a next reference point according to the object rotation angle, the viewpoint and the view direction; and instruction means for causing a computer to display the object located in the three-dimensional virtual space according to the next display position and the next reference point.

BRIEF DESCRIPTION OF THE DRAWINGS

FIG. 4 is an example of shape data arranged by kind of object.

FIG. 5 is an example of position data arranged by object in virtual space.

FIG. 6 is key frame data of each part of a human model arranged by kind of action.

DETAILED DESCRIPTION OF THE PREFERRED EMBODIMENTS

Figure 1:
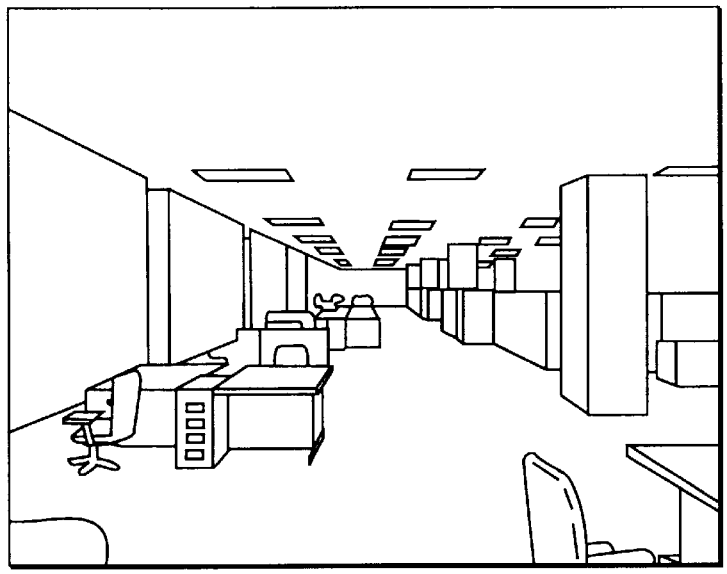
FIG. 1 is an example a display screen showing a conventional viewpoint of a human model.
Figure 2:
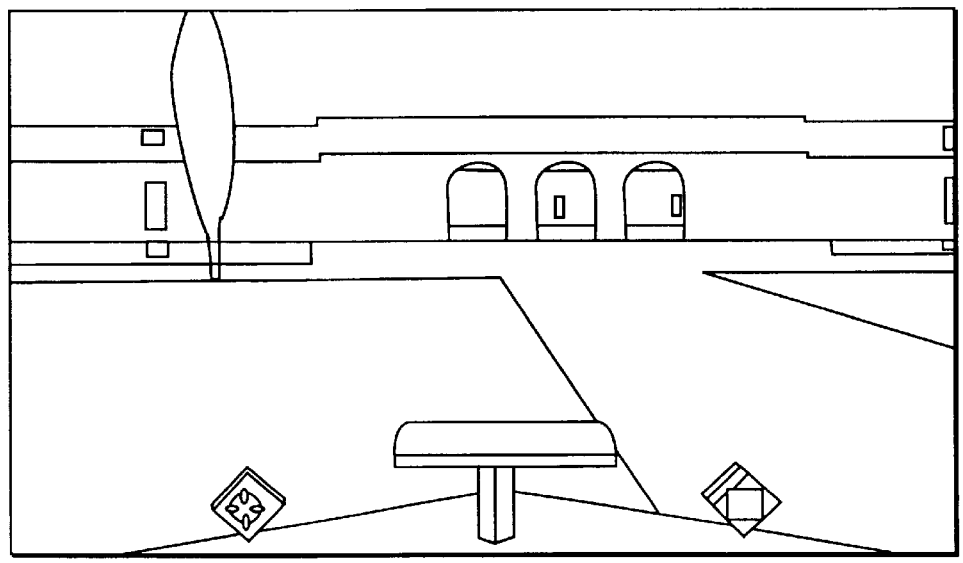
FIG. 2 is a another example of a display screen showing a conventional viewpoint.
Figure 3:
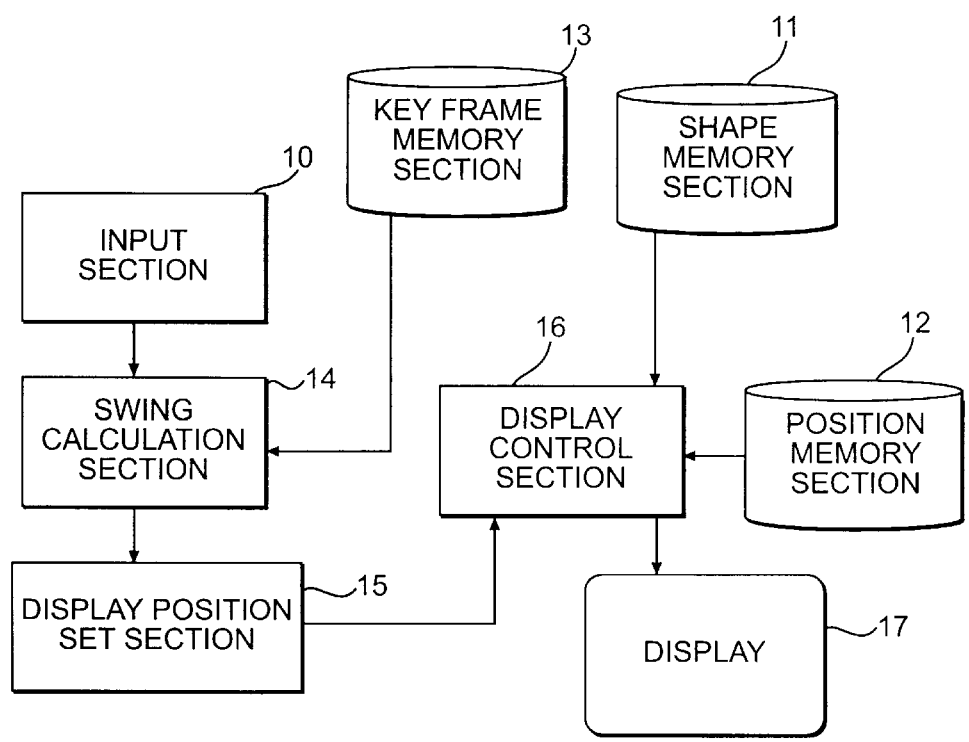
FIG. 3 is a block diagram of virtual object display apparatus according to a first embodiment of the present invention.

Embodiments of the present invention are described below with reference to the drawings. FIG. 3 is a block diagram of virtual object display apparatus according to a first embodiment of the present invention. As shown in FIG. 3, the virtual object display apparatus includes an input section 10, a shape memory section 11, a position memory section 12, a key frame memory section 13, a swing calculation section 14, a display position set section 15, a display control section 16 and a display 17. The input section 10 is, for example, a mouse for inputting a start instruction and end instruction to control movement of the human model. The input section 10 can be provided as other types of input device, i.e., joystick, data globe, keyboard, etc.

The shape memory section 11 stores shape data according to the kind of object in virtual space. FIG. 4 is an example of the shape data in the shape memory section 11. The shape data includes object name, ID number, center coordinate, eight coordinates of a bounding box of the object, and a pointer to detailed shape data (detailed shape data of each object is previously stored in another memory section).

The position memory section 12 stores position data of virtual objects located in three-dimensional virtual space. FIG. 5 is an example of the position data in the position memory section 12. The position data includes an ID number of each object, an ID number of shape data of the object, a position coordinate of the object and rotation angle of the object in virtual space.

The key frame memory section 13 stores a set value (angle $(\alpha, \beta, \gamma)$ based on X axis, Y axis, Z axis) of each part of the human model in the case of the human model walking in three-dimensional virtual space. FIG. 6 is an example of the key frame data in the key frame memory section 13. The key frame data includes the type or kind of action (walk, run and so on), the number of samples to execute the action, a sample number of the action, a part of the human model and the set value of the part. As shown in FIG. 6, seven samples (0~6) of set values of each part of the model are necessary for the human model to execute a walking action. The three sample numbers (1,2,3) corresponds to one walking step of the right leg of the human model because the right leg is treated as the axis leg. The three sample numbers (4,5,6) correspond to one walking step of the left leg of the human model. Each part (right leg, right lower leg, left leg, left lower leg, right arm, left arm) of the human model is moved according to set values by unit of sample number.

Figure 7:
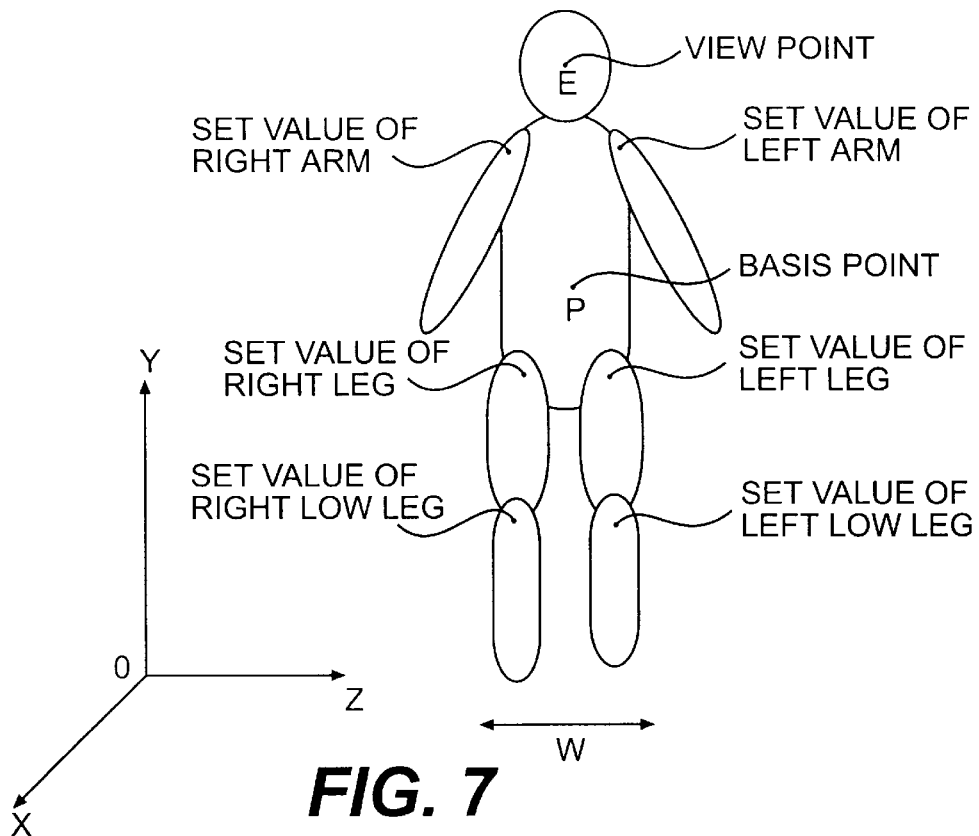
FIG. 7 is a schematic diagam of each part of the human model.

FIG. 7 is a schematic diagram of the relation between the position of each set value and each part of the human model. Additionally, a view point E (eye point), a basis point P (center point) of the human body and stance width W are shown in FIG. 7. As described above, one walking step of the human model in virtual space is executed by the set values of samples (0~6).

The swing calculation section 14 calculates the position of the basis point of the human model by unit of action when the human model walks in virtual space, and calculates the viewpoint corresponding to the basis point.

The display position set section 15 calculates a display position which is the camera position to display the virtual space on the display screen according to the viewpoint.

Figure 8:
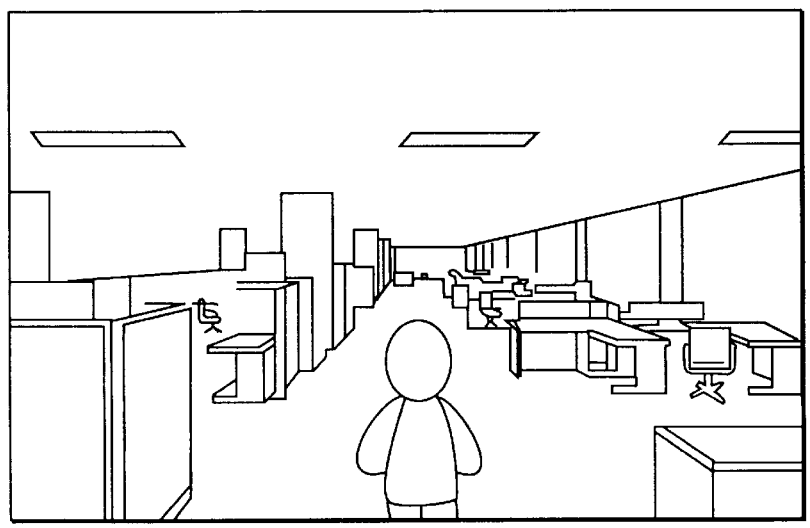
FIG. 8 is an example of a display screen of virtual space including the human model.

The display control section 16 creates the virtual image including the human model according to the display position, and outputs the virtual image as viewed from the display position. FIG. 8 is an example of the display screen of the virtual image displayed behind the human model.

Figure 9:
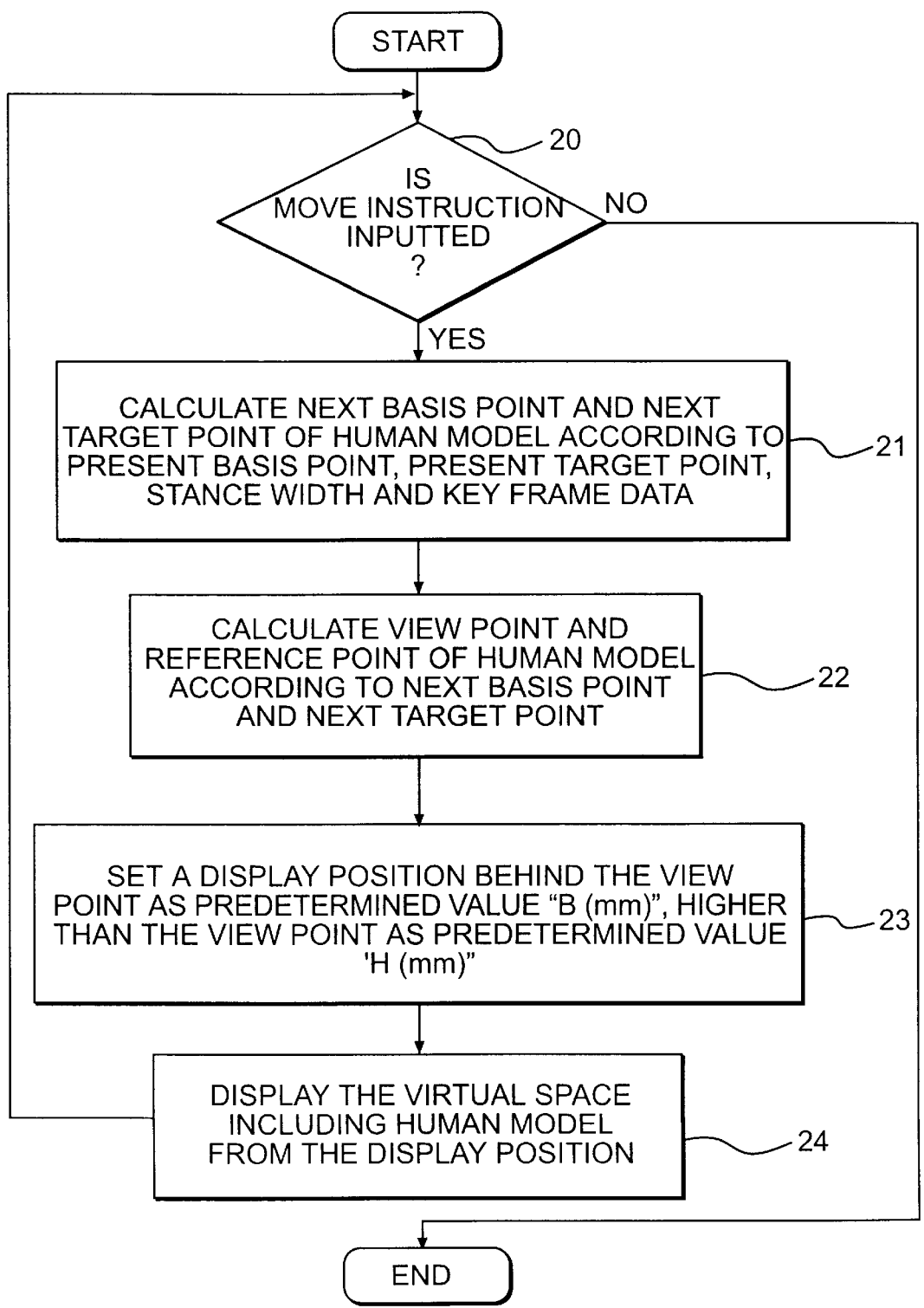
FIG. 9 is a flow chart of processing according to the first embodiment of the present invention.

FIG. 9 is a flow chart of processing according to the first embodiment of the present invention. The detailed processing of the first embodiment will be explained referring to FIG. 9. First, a user inputs a move instruction through the input section 10 (step 20). The swing calculation section 14 calculates the next basis point and the next target point of the human model according to the present basis point, present target point, stance width W and key frame data of the human model leg stored in the key frame memory section 13 (step 21).

Figure 10:
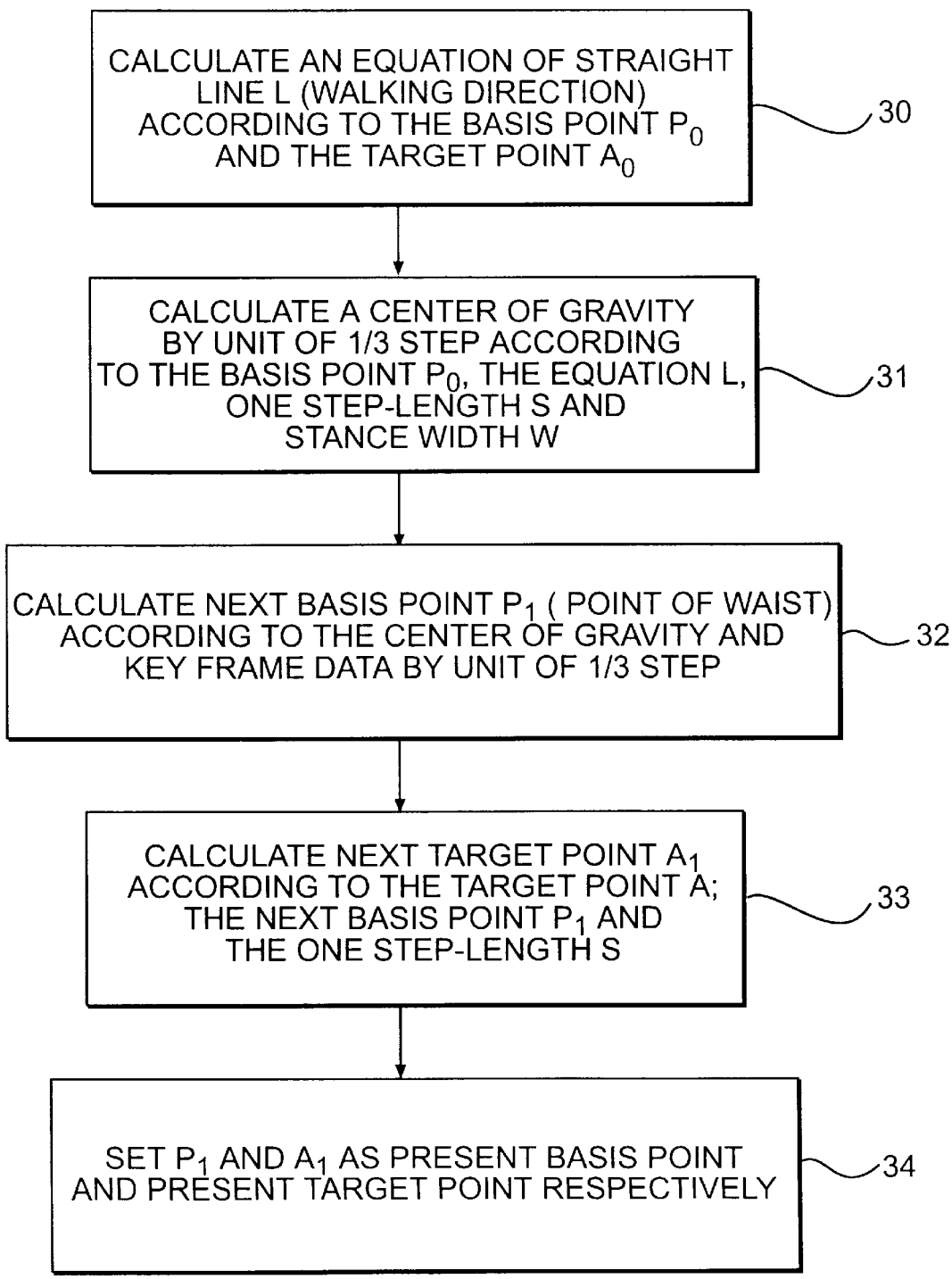
FIG. 10 is a flow chart of a process for calculating a basis point and target point according to the first embodiment.
Figure 11:
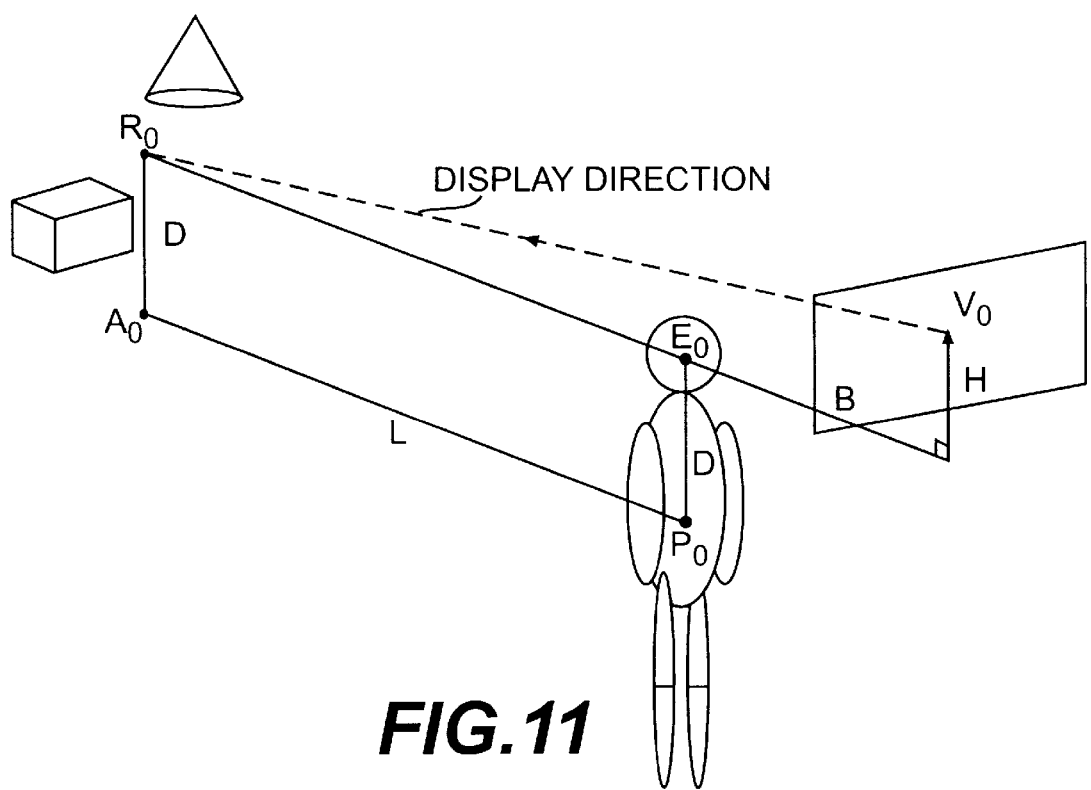
FIG. 11 is a schematic diagram of the relationship among the human model, reference point and display point in virtual space.
Figure 12:
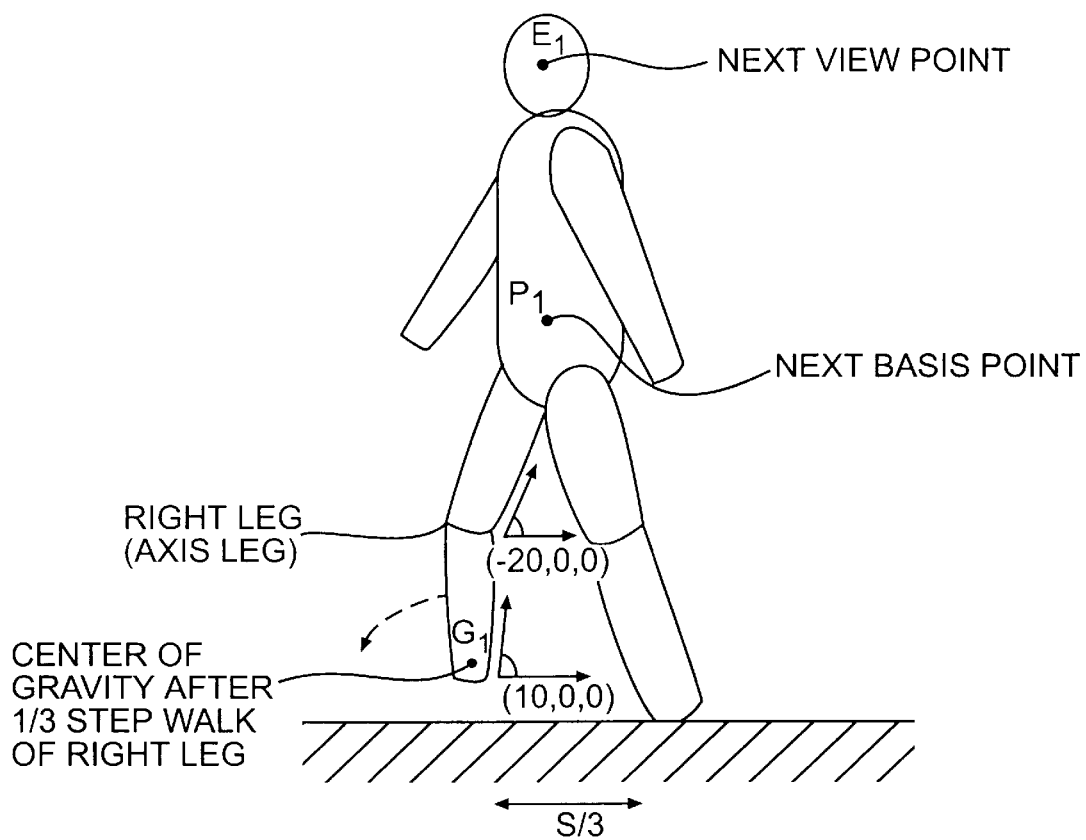
FIG. 12 is a schematic diagram of the human model walking in virtual space.

FIG. 10 is a flow chart of the process for calculation the next basis point and next target point. FIG. 11 is a schematic diagram showing the relation among the human model, the present target point $A_0$, and the present display position $V_0$. It is assumed that the present basis point $P_0$ and present target point $A_0$ are previously fixed and the axis leg of the human model is the right leg. First, an equation of the straight line L (walking direction) is calculated according to the present basis point $P_0$ and the present target point $A_0$ as shown in FIG. 11 (step 30). Then, a center of gravity of the foot of the right leg is calculated by unit of 1/3 step according to the present basis point $P_0$, the walking direction, 1/3 step width (S/3) and stance width (W) in virtual space (step 31). FIG. 12 is a schematic diagram of the walking human model taking a 1/3 step with the right leg (axis leg).

As shown in FIG. 12, a next basis point $P_1$ is calculated according to the center of gravity $G_1$ and key frame data (angle (−20.0, 0.0, 0.0) of the right upper leg and angle (10.0, 0.0, 0.0) of right low leg for sample number 1 (shown in FIG. 6) stored in the key frame memory section 13 (step 32). Then, a next target point $A_1$ is calculated according to the next basis point $P_1$, the present target point $A_0$ and 1/3 step length(S/3) (step 33).

Figure 13:
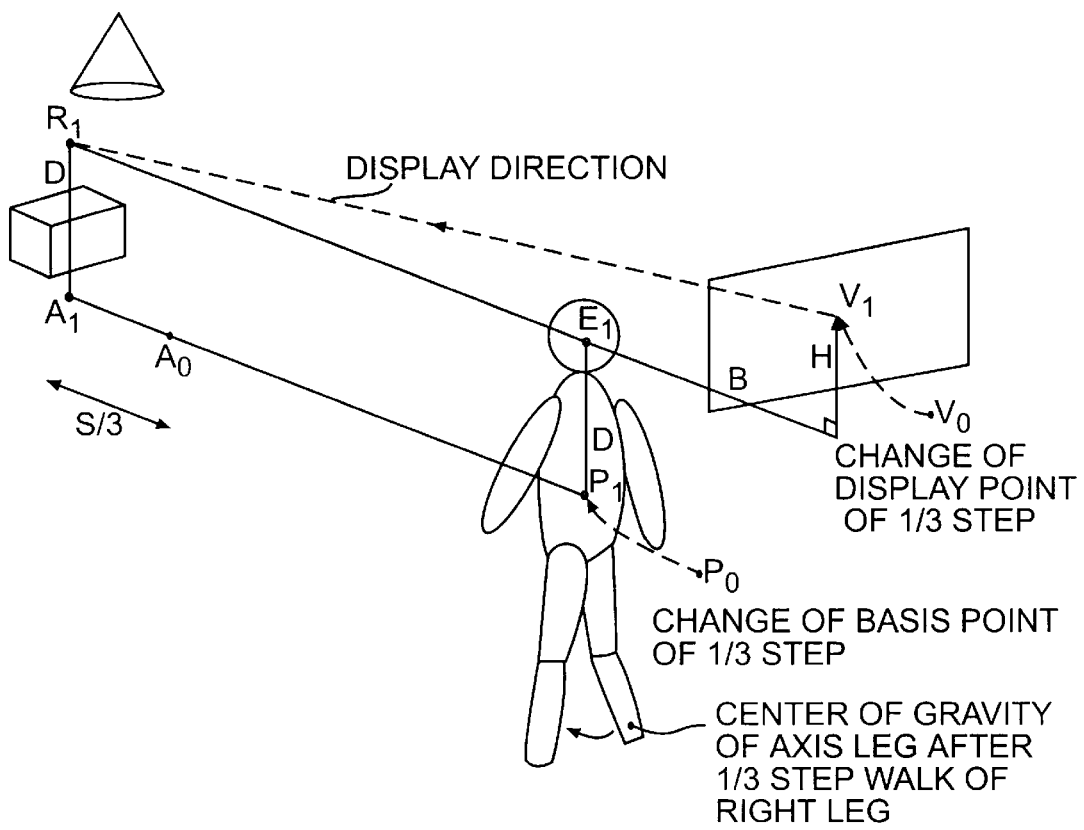
FIG. 13 is a schematic diagram showing a change of basis point, display point and reference point caused by one walking step of the human model.

FIG. 13 is a schematic diagram of the human model which has walked 1/3 step with the right leg in virtual space. As shown in FIG. 13, a straight line between the next basis point $P_1$ and the present target point $A_0$ is extended by the 1/3 step length (S/3). The extended end point is the next target point $A_1$. Then, the next basis point $P_1$ and the next target point $A_1$ are respectively set as present basis point and present target point (step 34).

Next, as shown in FIG. 13, the view point $E_1$, which is higher than the basis point $P_1$ by D (mm) along the vertical direction, is calculated. In the same way, the reference point $R_1$, which is higher than the target point $A_1$ by D (mm) along the vertical direction, is calculated (step 22). Then, a display position $V_1$ corresponding to the camera position is calculated behind the viewpoint $E_1$ (step 23). As shown in FIG. 13, a straight line between the reference point $R_1$ and the viewpoint $E_1$ is extended to the viewpoint $E_1$ by B (mm). After the extended end point is determined, the display position $V_1$, which is higher than the extended end point by H (mm) along the vertical direction, is determined (for example, B=2000 (mm), H=300 (mm)).

In an initial mode, as shown in FIG. 11, the display position $V_0$ and the reference point $R_0$ is previously set in the same way as the case in which the human model does not walk. Therefore, in FIG. 11, the camera position is the display position $V_0$ and the camera direction is the display direction from the display position $V_0$ to the reference point $R_0$. However, when the human model has walked by 1/3 step with the right leg, the camera position is the display position $V_1$ and the camera direction is the display direction from the display camera position $V_1$ to the reference point $R_1$ as shown in FIG. 13. In short, the camera position is swung from the display position $V_0$ to the display position $V_1$ by 1/3 step walking with the right leg of the human model. The reason why the display position is calculated by unit of 1/3 step of the human model is that the set value of each part of the human model is stored by unit of 1/3 step for the human model's walking. In this way, whenever the human model walks 1/3 step with the right leg and left leg cooperating (right leg 1/3 step→2/3 step→1 step, left leg 1/3 step→2/3 step→1 step), the virtual image including the human model is created from the display position (camera position) toward the display direction (camera direction) by unit of 1/3 step. That is, there is a display position and display direction corresponding to each unit of 1/3 step. The virtual image is displayed through the display section 17 by unit of 1/3 step walking of the human model. These processing is repeated by unit of 1/3 step walk of the human model untill a stop instruction is inputted through the input section 10.

As described above, in the first embodiment, virtual space displayed on the screen is swung according to the human model's walking by unit of 1/3 step and the user has the feeling of walking in virtual space. Additionally, the display position is located behind the human model walking in virtual space and the virtual space including the human model is displayed. Therefore, the user understands the size of virtual object in virtual space.

In the first embodiment, in the case of "B=0 (mm), H=0 (mm)", the display position $V_1$ coincides with the viewpoint $E_1$ of the human model and the display direction is a direction from the view point $E_1$ to the reference point $R_1$ in FIG. 13. In this case, the virtual space without the human model is displayed on the screen. Therefore, the time to create the virtual image, at high speed, is comparable with the time to create the virtual image including the human model, while the user has the feeling of being in the virtual image.

Figure 14:
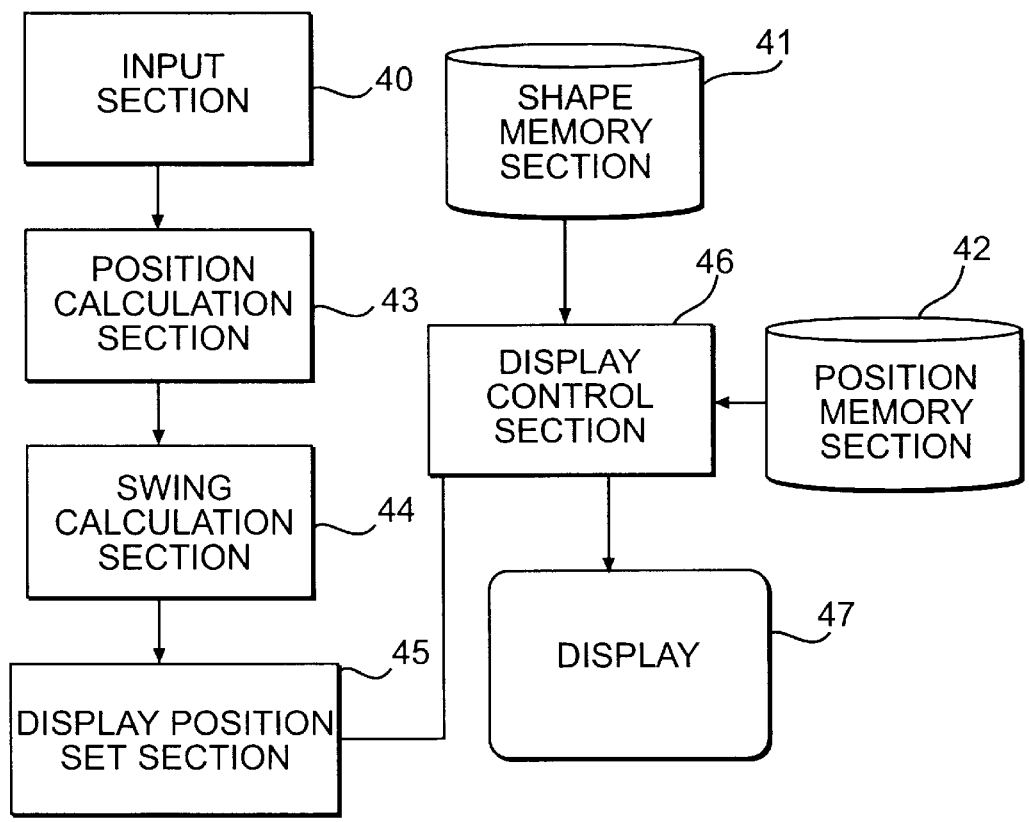
FIG. 14 is a block diagram of a modification of the first embodiment.

FIG. 14 is a schematic diagram of the virtual object display apparatus according to a modification of the first embodiment. In FIG. 14, a position calculation section 43 calculates the walking direction, the basis point, the target point, the view point and the reference point. A swing calculation section 44 calculates the display position and the display direction. In this case, the swing of the display position may be represented by the following equation.

$$y = a \cdot \cos(2\pi \cdot t/T) + h$$

(where $a$: width of amplitude, $t$: time, $T$: time of one step $h$: height)

Figure 15:
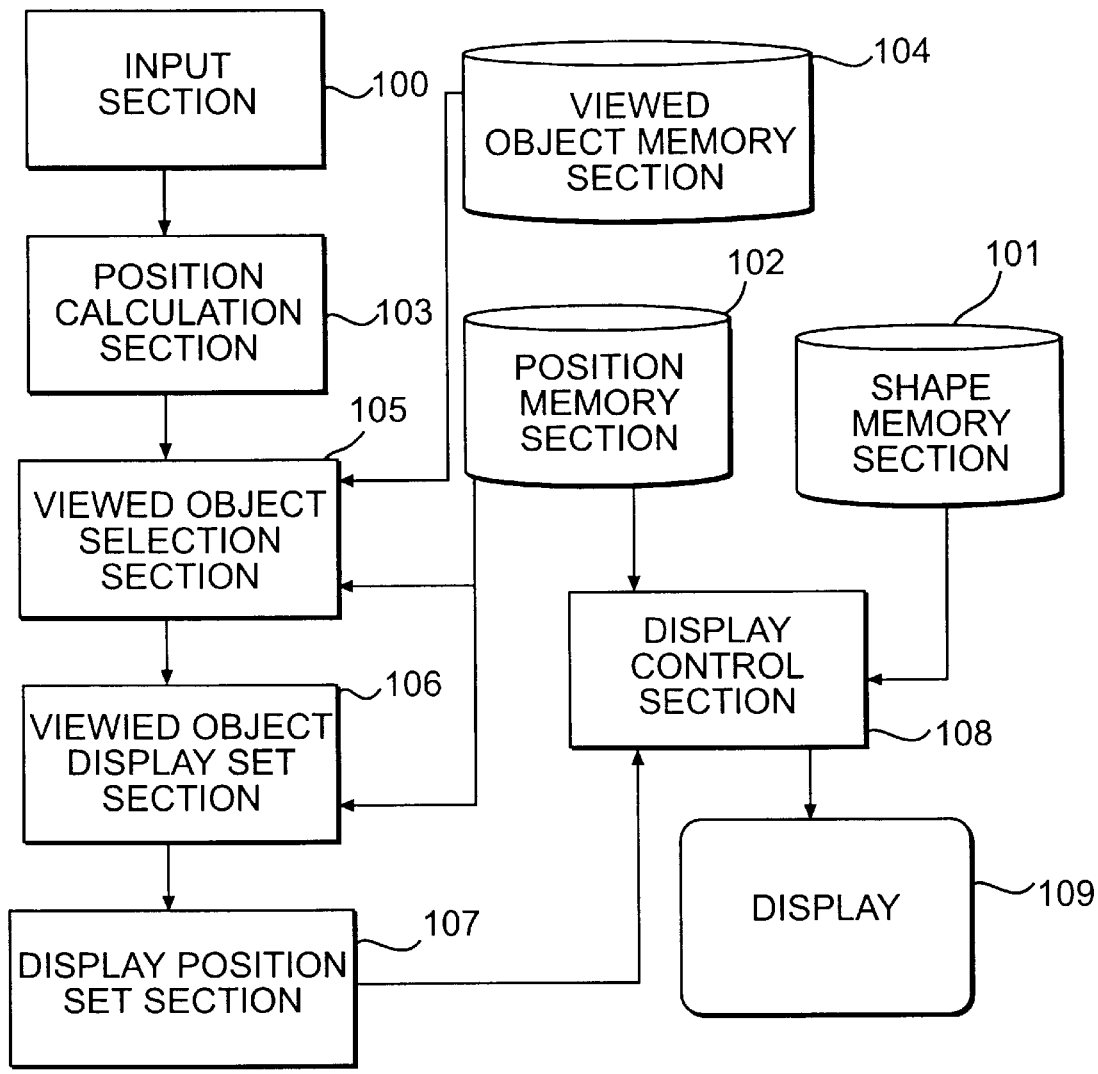
FIG. 15 is a block diagram of virtual object display apparatus according to a second embodiment of the present invention.

FIG. 15 is a block diagram of virtual object display apparatus according to a second embodiment of the present invention. As shown in FIG. 15, the virtual object display apparatus includes an input section 100, a shape memory section 101, a position memory section 102, a position calculation section 103, a viewed object memory section 104, a viewed object selection section 105, a viewed object display set section 106, a display position set section 107, a display control section 108 and a display 109. A user inputs a movement direction of the human model, a start instruction and an end instruction for the movement through the input section 100. For example the input section 100 is a mouse. The shape memory section 101 stores shape data of virtual objects according to the kind of object, which is same as the shape memory section 11 in FIG. 3. The position memory section 102 stores the position data of objects located in the three-dimensional virtual space, which is same as the position memory section 12 in FIG. 3. The position calculation section 103 calculates the view position of the human model along the walking direction in virtual space. The viewed object memory section 104 stores the object name which the human model (user) can view in the object names of the position memory section 102. The viewed object selection section 105 selects the object located nearest to the viewpoint and decides whether the anglular relationship between the object and the walking direction satisfies a predetermined condition. If the angular relationship satisfies the condition, the viewed object selection section 105 selects the object as the viewed object. The viewed object display set section 106 retrieves the position data of the viewed object from the position data stored in the position memory section 102 and sets the position data as the reference point. The display position set section 107 sets the display position (camera position) according to the viewpoint calculated by the position calculation section 103. The display control section 108 creates the virtual image according to the display position and the reference point, and outputs the virtual image to the display 109.

Figure 16:
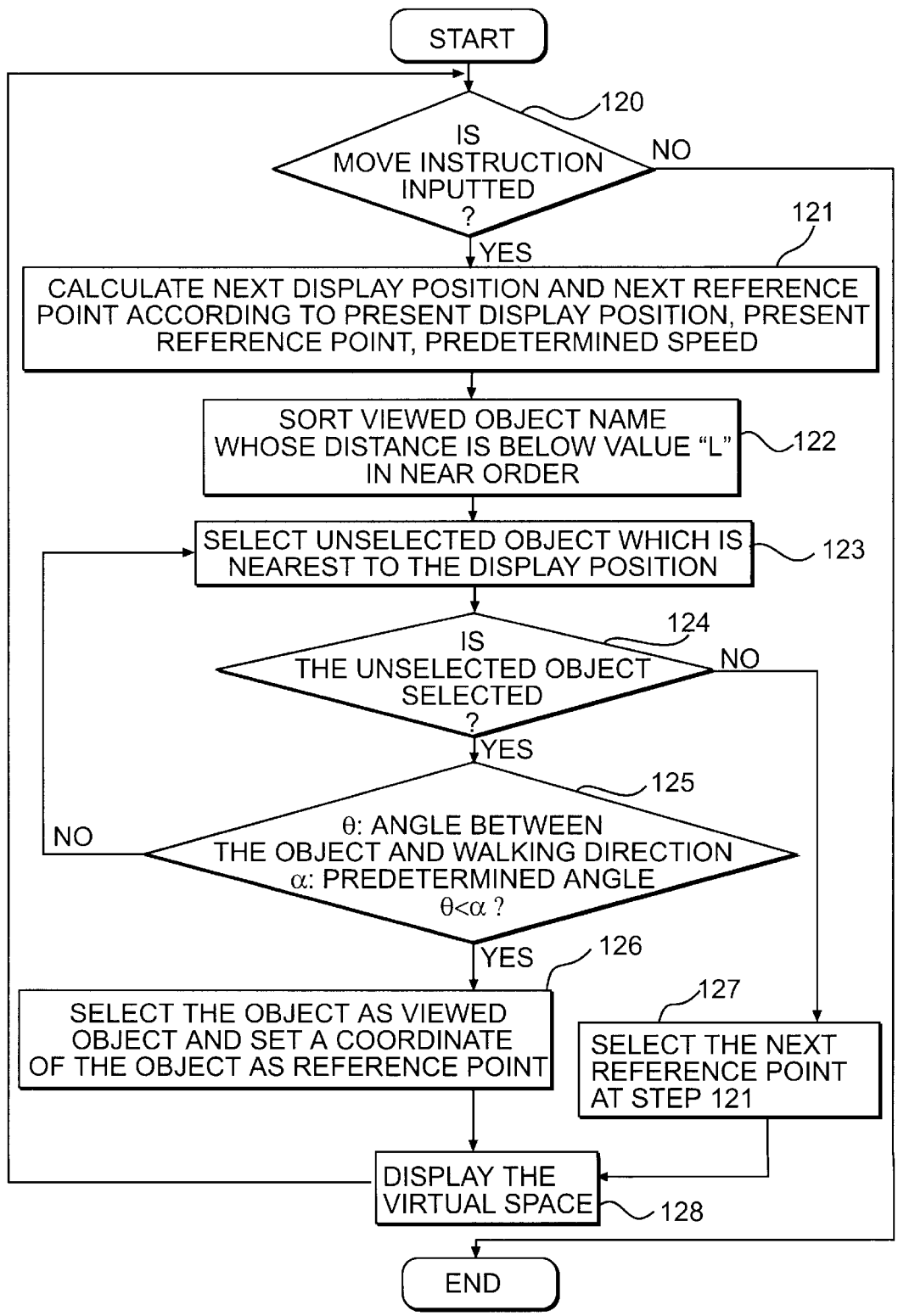
FIG. 16 is a flow chart of processing according to the second embodiment of the present invention.
Figure 17:
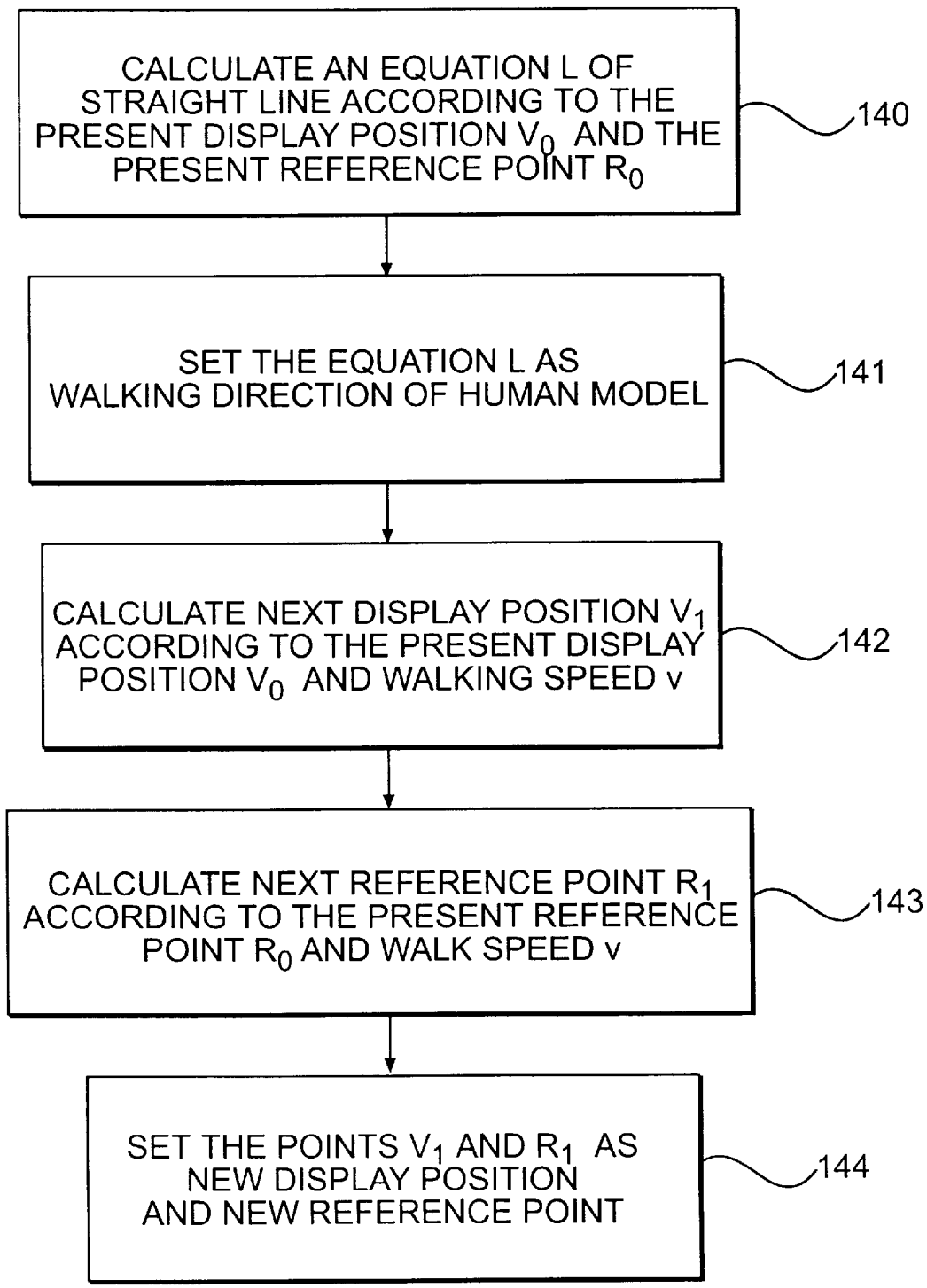
FIG. 17 is a flow chart of a process for calculating the display point and reference point according to the second embodiment.

FIG. 16 is a flow chart of processing of the second embodiment. FIG. 17 is a flow chart of processing for calculating a next display point and next reference point. The detailed processing of the second embodiment will be explained referring to FIG. 16 and FIG. 17. First, the user inputs the move instruction through the input section 100 (step 120). In this case, it is assumed that the present (initial) display position, present (initial) reference point and walking speed υ of the human model is previously determined. The position calculation section 103 calculates the next display position and next reference point according to the present display position, the present reference point and the walking speed (step 121).

Figure 18:
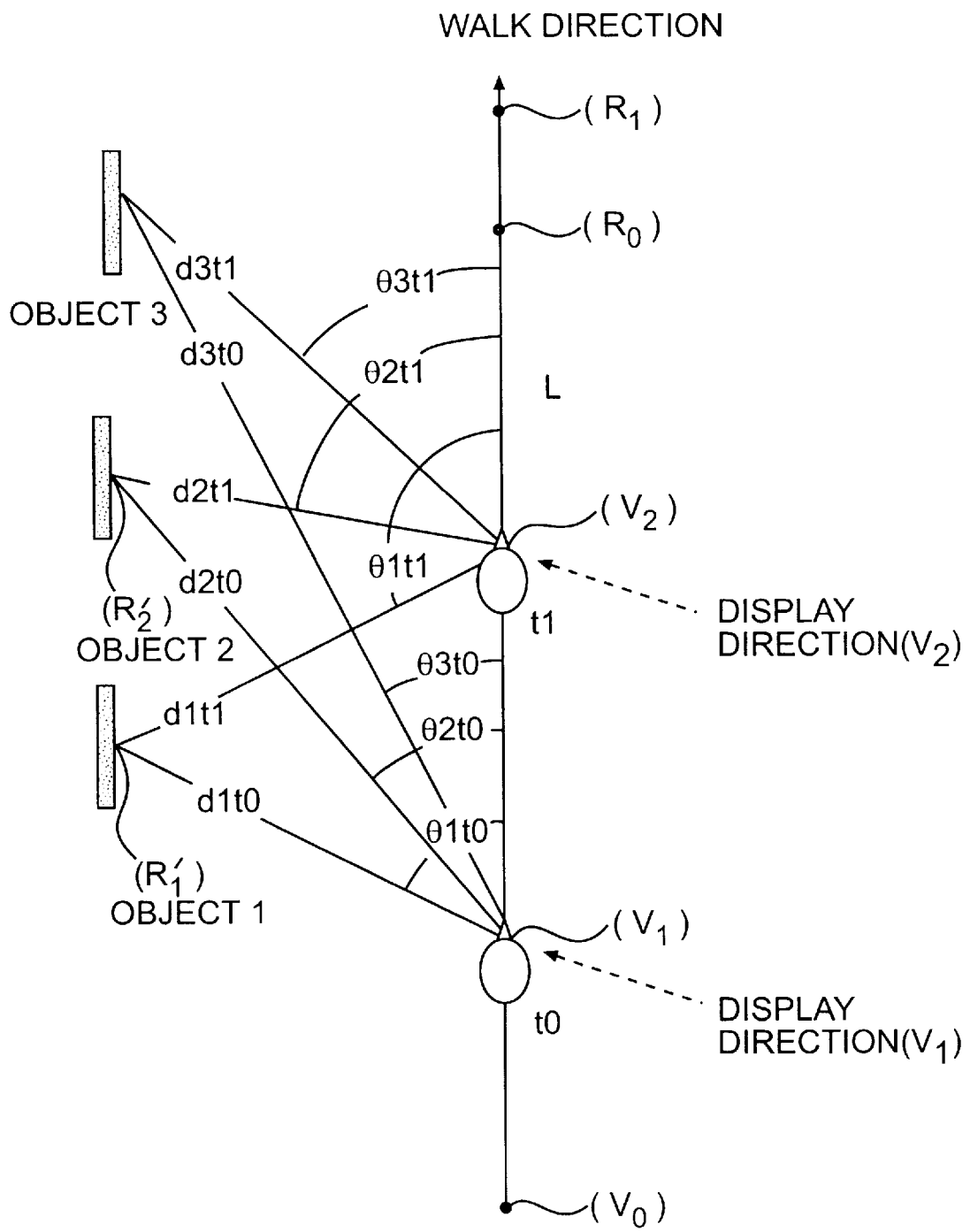
FIG. 18 is a schematic diagram of the relationship between an object being viewed and display direction while the human model walks.

FIG. 18 is a schematic diagram of a plan view showing the relation between the display position of the head of the human model and the reference point along the walking direction. In the processing of step 121, an equation of the straight line L from the present display position (view point) $V_0$ to the present reference point $R_0$ is calculated (step 140). As shown in FIG. 18, the straight line L is along the walking direction (step 141). Then, a next display position $V_1$ is calculated according to the present display position $V_0$ and walking speed υ along the walking direction (step 142). As shown in FIG. 18, the head position (to) of the human model corresponds to the next display position $V_1$. A next reference point $R_1$ is calculated using the present reference point $R_0$ and the walking speed υ along the walking direction (step 143). As shown in FIG. 18, the next reference point $R_1$ is set as an extended point along the straight line L. In this way, the next display position $V_1$ and the next reference point $R_1$ are set as the present (new) display position and the present (new) reference point (step 144).

Then, the viewed object selection section 105 selects the object name for each object for which a distance between the object and the display position $V_1$ is below a predetermined value "d", from the object names in the viewed object memory section 104. The viewed object selection section 105 ranks the selected object names in order of distance from the display position $V_1$ (step 122). One object which is at the shortest distance from the display position $V_1$ is selected (step 123). Then, the position of the one object is retrieved from the position memory section 102 and a display direction from the display position $V_1$ to the position of the one object is calculated.

Then, the viewed object selection section 105 decides whether an angle θ between the display direction and the walking direction is below a predetermined angle α or not (steps 124,125). If the angle θ is below the angle α, the one object is selected as the viewed object from the display position $V_1$ and the coordinate position of the one object as the reference point $R_1$' (step 126) is set. If the angle θ is not below the angle α, the reference point $R_1$ calculated at step 121 is selected (step 127). In this way, the virtual image is created from the display position $V_1$ along the display direction (or the walking direction) and output to the display section 109 (step 128). This display processing is repeated by unit of the human model's walking at the predetermined speed untill a stop instruction is input through the input section 100. For example, in FIG. 18, when the human model is located at the display position $V_1$ (at time to) along the walking direction, it is assumed that a distance between the head and the object 1 at time $t_0$ is $d_1 t_0$, a distance between the head and the object 2 at time $t_0$ is $d_2 t_0$, and a distance between the head and the object 3 at time $t_0$ is $d_3 t_0$.

$d_1 t_0 < d_2 t_0 < d_3 t_0$

The above inequality is apparently proved as shown in FIG. 18. If the angle $θ_1 t_0$ is less than the angle α, the object 1 is selected as the viewed object at the display position $V_1$. In this case, the camera position is the display position $V_1$ and the camera direction is the display direction ($V_1$) to create the virtual image.

On the other hand, in FIG. 18, when the human model is located at the display position $V_2$ (at time $t_1$) along the walk direction, it is assumed that a distance between the head and the object 1 at time t1 is $d_1\ t_1$, a distance between the head and the object 2 at time t1 is $d_2\ t_1$, a distance between the head and the object 3 at time t1 is $d_3\ t_1$.

$$d_2\ t_1 < d_1\ t_1 < d_3\ t_1$$

The above inequality is apparently proved as shown in FIG. 18. If the angle $\theta_2\ t_1$ is less than the angle $\alpha$, the object 2 is selected as the viewed object at the display position $V_2$. In this case, the camera position is the display position $V_2$ and the camera direction is the display direction ($V_2$) to create the virtual image.

As described above, in the second embodiment, while the human model walks along the predetermined direction, surrounding objects near the position of the human model are displayed one after another. Therefore, the user has a feeling of movement as though he is walking while looking at many objects in actual space.

In the second embodiment, the viewed object which the human model can see is selected by referring to the viewed object memory section 104. However, the surrounding object which is depicted as having the largest size on the display screen may be selected as the viewed object. For example, a distance between the viewpoint and the object is calculated and a size of the object is calculated according to the bounding box of the object. Then, a ratio of the size to the distance is calculated. The object whose ratio is the largest value among all objects is selected as the viewed object. In this method, the viewed object memory section 104 is not necessary for the virtual object display apparatus. Therefore, the time required to previously input data by the user is greatly reduced.

Figure 19:
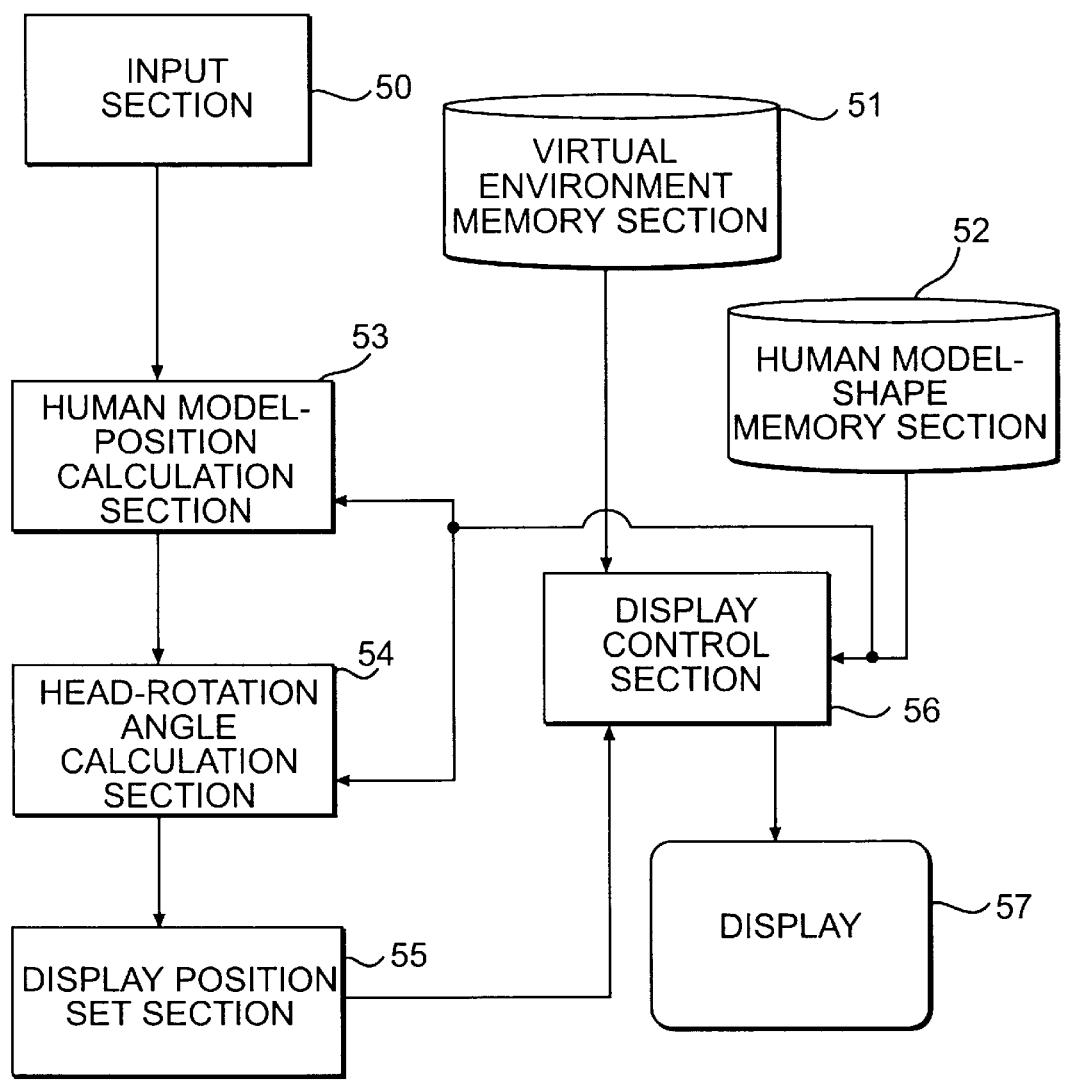
FIG. 19 is a block diagram of virtual object display apparatus according to a third embodiment of the present invention.

FIG. 19 is a block diagram of virtual object display apparatus according to a third embodiment of the present invention. The virtual object display apparatus of the third embodiment includes an input section 50, a virtual environment memory section 51, a human model-shape memory section 52, a human model-position calculation section 53, a head-rotation angle calculation section 54, a display position set section 55, a display control section 56 and a display 57. The user inputs move instructions of the viewpoint through the input section 50, such as a mouse. The virtual environment memory section 51 stores position data and figure data of each object located in the virtual space. The human model-shape memory section 52 stores shape data of each part of the human model. The human model-position calculation section 53 calculates the position (viewpoint, view direction) of the human model according to the shape data in the human model-shape memory section 52 and the move instruction of the input section 50. The head-rotation angle calculation section 54 calculates the rotation angle of the head of the human model according to the shape data of the human model-shape memory section 52 and the move instruction of the input section 50. The display position set section 55 sets the display position by referring to the input value of the move instruction of the input section 50. The display control section 56 creates an image of the virtual space including the human model according to the display position, data of the virtual environment memory section 51 and the human model-shape memory section 52, and outputs the image to the display 57.

Figure 20:
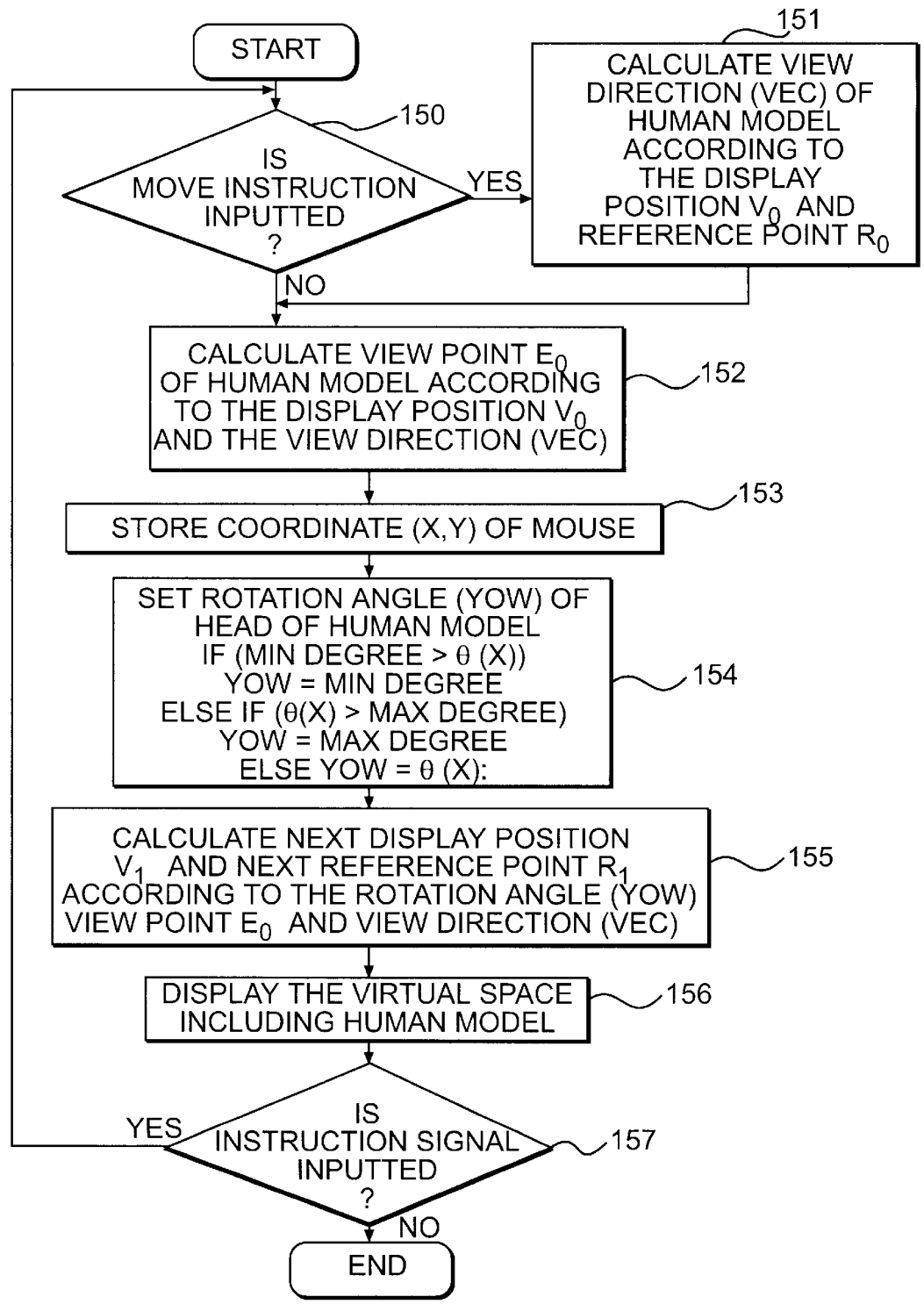
FIG. 20 is a flow chart of processing according to the third embodiment of the present invention.
Figure 21:
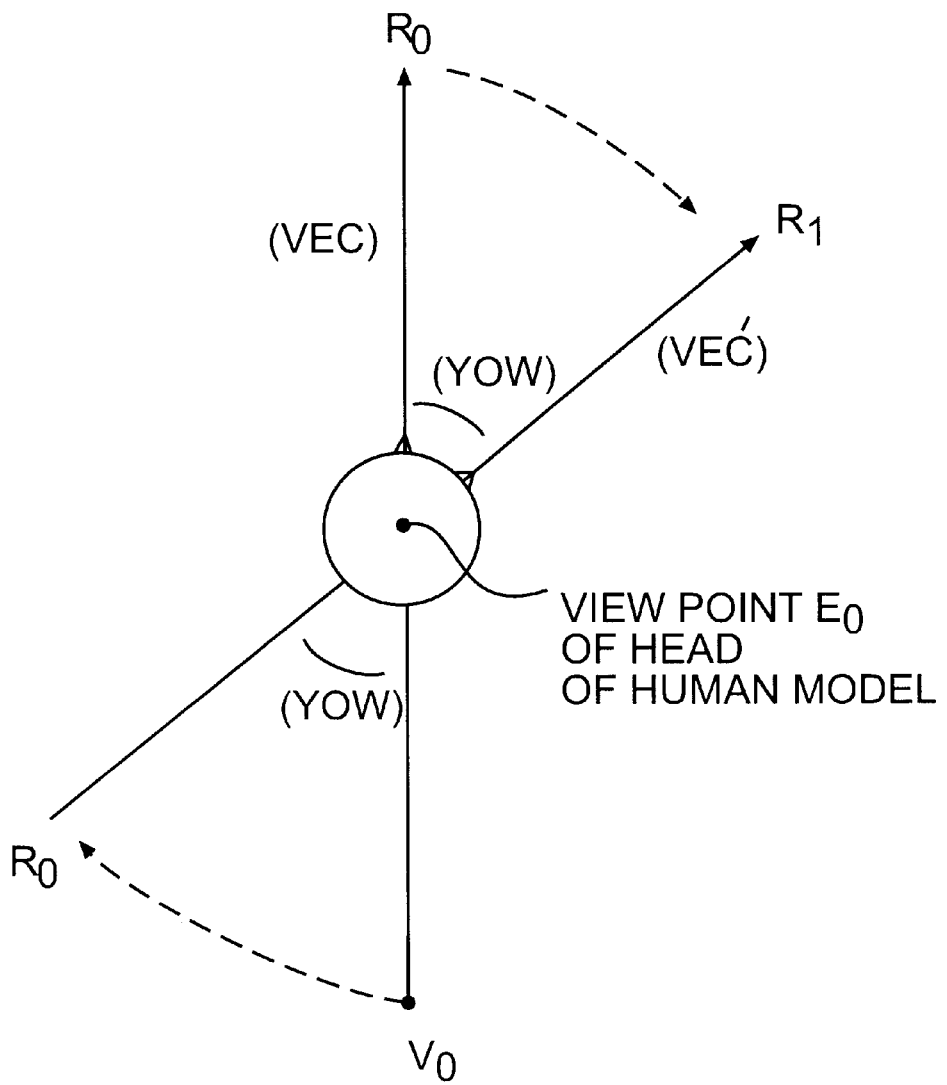
FIG. 21 is a schematic diagram of the rotation of a head of the human model in virtual space.
Figure 22:
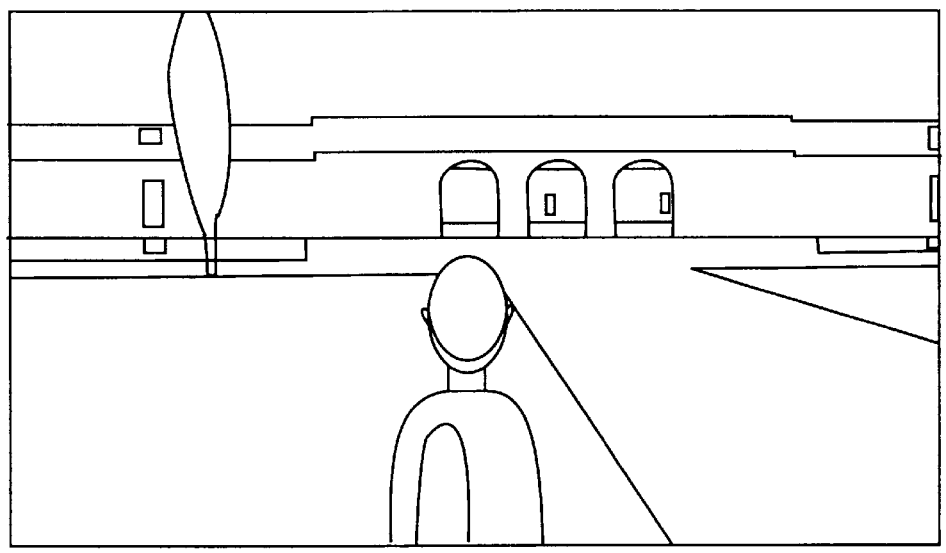
FIG. 22 is an example of a display screen of virtual space including the human model according to the third embodiment.

FIG. 20 is a flow chart of processing of the third embodiment. FIG. 21 is a schematic diagram of a plan view showing the relation between the viewpoint and the view direction of the head of the human model. FIG. 22 is an example of the display screen whose image is created by the virtual object display apparatus of the third embodiment. The detailed processing of the third embodiment will be explained referring to FIG. 20, FIG. 21, and FIG. 22, First, the user inputs the move instruction and move direction through the input section 50 (step 150). For example, the move instruction is inputted by pushing a button of the mouse. In the case of the center value of the display screen being "(X,Y)=(0,0)", a coordinate value of the moved position of the mouse is changed value of the view direction (step 153). It is assumed that the intial display position $V_0$ and initial reference point $R_0$ of the human model are previously set.

In the case that the move instruction is inputted, the initial view direction (VEC) of the human model is calculated according to the display position $V_0$ and the reference point $R_0$ as shown in FIG. 21 (step 151). Then, the viewpoint $E_0$ of the human model is calculated according to the display position $V_0$ and the view direction (VEC) (step 152). In short, in the same way of the first embodiment shown in FIG. 11, a lower point which H(mm) is below the display point $V_0$ along vertical direction is calculated and a straight line between the lower point and the reference point $R_0$ is calculated. The viewpoint $E_0$ which is apart from the lower point by B (mm) on the straight line is calculated.

Then, the rotation angle of the head of the human model is calculated according to the input coordinate (X,Y) of the mouse (step 154). In this case, the X-value of the input coordinate of the mouse corresponds to the rotation angle. A maximum degree and a minimum degree are previously set and angle corresponding to the X-value is compared with the maximum degree and the minumum degree. If the angle corresponding to the X-value is smaller than the minimum degree, the rotation angle (yow) is set as the minimum degree. If the angle corresponding to the X-value is larger than the maximum degree, the rotation angle (yow) is set as the maximum degree. In other cases, the rotation angle (yow) is set corresponding to the X-value itself.

Then, the next display position $V_1$ and next reference point $R_1$ are calculated according to the rotation angle (yow), the viewpoint $E_0$ and the view direction (VEC) (step 155). As shown in FIG. 21, the viewpoint $E_0$ of the head of the human model is set as the center point for rotation and the head is rotated by the rotation angle (yow). In short, the next reference point $R_1$ is determined by rotating the reference point $R_0$ by the angle (yow) based on the center point of the view point $E_0$. The next display position $V_1$ is decided by rotating the display position $V_0$ by the angle (yow) based on the center point of the view point $E_0$. In this way, the image of the virtual space including the human model is created for the new display position $V_1$ and the new reference point $R_1$. The image is outputted to the display 57 (step 156).

As shown in FIG. 22, the head of the human model is rotated by the angle (yow) on the display screen and the virtual image is displayed from behind the rotated head of the human model because the new display position $V_1$ is a point behind the head. After displaying the virtual space, it is determined whether the instruction signal is inputted through the input section 50 (step 157). If the instruction signal is inputted, the instruction signal is determined to be the move instruction as described above (step 150). If the instruction signal is not inputted, all processing of the virtual object display method in FIG. 20 is complete.

As described above, in the third embodiment, the user's operation for looking around the virtual space corresponds to rotation of the head of the human model on the display screen. Therefore, the user can intuitively understand his operation result on the display screen.

A memory can be used to store instructions for performing the process described above. Such a memory can be provided as a CD-ROM, floppy disk and so on.

What is claimed is:

1. Virtual object display apparatus for displaying a virtual environment along a display direction from a display position to a reference point in three-dimensional virtual space, the display position being fixedly located behind a viewpoint of a walking human model relative to a walking direction, the reference point being located forward of the walking direction, the human model consisting of a plurality of body parts, comprising:

key frame memory means for storing a set value for each body part, wherein said set value corresponds to a unit sample of a walking motion in the three-dimensional virtual space, and wherein one step of the walking motion includes a plurality of unit samples;

swing calculation means for calculating the viewpoint of the human model for each unit sample of the walking motion in order according to the set value of each body part of the human model for the unit sample of the walking motion;

display position setting means for calculating a display position corresponding to the viewpoint of the human model in the three-dimensional virtual space for each unit sample of the walking motion; and display means for displaying the virtual environment in three-dimensional virtual space along the display direction from the display position to the reference point, wherein the display direction is changed in synchronization with change of the viewpoint of the human model by the unit sample of the walking motion.

2. Virtual object display apparatus according to claim 1, further comprising shape memory means for storing an item ID number, a center coordinate, a bounding box and a pointer to detailed shape data for each type of displayable item in the three-dimensional virtual space, and comprising position memory means for storing a shape data ID number, a position coordinate and a rotation angle for each type of displayable item in the three-dimensional virtual space.

3. Virtual object display apparatus according to claim 2, wherein said swing calculation means calculates the next basis point of the human model according to the present basis point, a walking direction, a stance width and the movement data of at least one leg of the human model, and includes means for calculating a next target point according to a present target point, the next basis point and the stance width.

4. Virtual object display apparatus according to claim 3, wherein said swing calculation means includes means for calculating a viewpoint and a reference point of the human model according to the next basis point, the next target point and a predetermined height of the human model.

5. Virtual object display apparatus according to claim 4, wherein said display position set means calculates the display position which is behind the human model relative to the walk direction, from a predetermined next viewpoint, and vertically higher than the next view point by a predetermined value.

6. Virtual object display apparatus according to claim 5, wherein said display means displays the human model in the three-dimensional virtual space according to the display position being a camera position having a camera direction directed from the display position to the reference point.

7. Virtual object display apparatus for displaying a virtual object from a display position moving along a fixed direction in three-dimensional virtual space, a plurality of virtual objects being previously located surrounding the fixed direction, comprising:

viewed object memory means for storing object information of the virtual object viewable from each of predetermined positions along the fixed direction in the three-dimensional virtual space;

position calculation means for calculating the display position for moving in sequence along the fixed direction according to a predetermined speed of the display position;

viewed object selection means for selecting the virtual object to be viewed from the calculated display position according to a distance between the calculated display position and a position of each viewable object stored in said viewed object memory means whenever the calculated display position coincides with one of the predetermined positions along the fixed direction; and display means for displaying the virtual space along the fixed direction from the calculated display position when the calculated display position does not coincide with all of the predetermined positions along the fixed direction while moving along the fixed direction, and for displaying the selected object in the three-dimensional virtual space along a display direction from the calculated display position to a position of the selected object whenever the calculated display position coincides with one of the predetermined positions along the fixed direction while moving along the fixed direction.

8. Virtual object display apparatus according to claim 7, wherein the movement direction is a direction in which a human model walks in the three-dimentional virtual space and the display position is a viewpoint of the walking human model in the three-dimensional virtual space.

9. Virtual object display apparatus according to claim 8, further comprising shape memory means for storing an ID number, a center coordinate, a bounding box and a pointer to detailed shape data for each type of object, and comprising position memory means for storing a shape data ID number, a position coordinate and a rotation angle for each type of object in the three-dimensional virtual space.

10. Virtual object display apparatus according to claim 9, wherein said position calculation means calculates a next display position along the walking direction according to a present value of the display position and a predetermined walking speed of the human model.

11. Virtual object display apparatus according to claim 10, wherein said viewed object selection means ranks by distance the objects whose distance from the display position is below a predetermined value, and selects the object which is closest to the display position when an angle between the walking direction and a direction from the display position to the selected object is less than a predetermined angle.

12. Virtual object display apparatus according to claim 11, further comprising viewed object display set means for setting a center of gravity of the selected object as a reference point, and for setting a display direction from the display position to the reference point.

13. Virtual object display apparatus for displaying a virtual environment from a display position behind a head of a human model walking in three-dimensional virtual space, comprising:

position calculation means for calculating a view direction and a viewpoint of the human model according to a present display position and a present reference point of the human model, wherein the present display position is fixedly located behind the head of the human model, wherein the present reference point is located forward of a walking direction, wherein the view direction is a direction from the present display position to the present reference point, and wherein the viewpoint is a center point for rotation of the head of the human model;

display means for displaying the virtual environment along a present display direction from the present display position behind the head of the human model to the present reference point;

input means for inputting a move instruction for the head of the human model, wherein the move instruction includes a rotation angle and a rotation direction of the head of the human model; and rotation angle calculation means for calculating a head rotation angle of the human model according to the move instruction inputted by said input means, and for calculating a next display position and a next reference point, wherein the next display position is determined by rotating the present display position by the head rotation angle based on the viewpoint, and wherein the next reference point is determined by rotating the present reference point by the head rotation angle based on the viewpoint; and wherein said display means rotates the head of the human model according to the head rotation angle and the rotation direction in response to the move instruction, and displays the virtual environment along a next display direction from the next display position behind the rotated head of the human model to the next reference point.

14. Virtual object display apparatus according to claim 13, wherein said rotation angle calculation means compares the object rotation angle with a maximum angle and a minimum angle, and constrains the object rotation angle to be no greater than the maximum angle and no smaller than the minimum angle.

15. Virtual object display method for displaying a virtual environment along a display direction from a display position to a reference point in three-dimensional virtual space, the display position being fixedly located behind a viewpoint of a walking human model relative to a walking direction, the reference point being located forward of the walking direction, the human model consisting of a plurality of body parts in three-dimensional virtual space, comprising the steps of:

storing a set value for each body part, wherein said set value corresponds to a unit sample of the walking motion in three-dimensional virtual space, wherein one step of the walking motion includes a plurality of unit samples;

calculating the viewpoint of the human model for each unit sample of the walking motion in order according to a present basis point and the set value for each body part of the human model for the unit sample of the walking motion;

calculating the display position corresponding to the viewpoint of the human model in the three-dimensional virtual space for each unit sample for the walking motion; and displaying the virtual environment in three-dimensional virtual space along the display direction from the calculated display position to the reference point, wherein the display direction is changed in synchronization with change of the viewpoint of the human model by the unit sample of the walking direction.

16. Virtual object display method for displaying a virtual object from a display position moving along a fixed direction in three-dimensional virtual space, a plurality of virtual objects being previously located surrounding the fixed direction, comprising the steps of:

storing object information of the virtual object viewable from each of predetermined positions along the fixed direction in the three-dimensional virtual space;

calculating the display position for moving in sequence along the fixed direction according to a predetermined speed of the display position;

selecting the virtual object to be viewed from the calculated display position according to a distance between the calculated display position and a position of each stored object to be viewed whenever the calculated display position coincides with one of the predetermined positions along the fixed direction;

displaying the virtual space along the fixed direction from the calculated display position when the calculated display position does not coincide with all of the predetermined positions alone the fixed direction while moving along the fixed direction; and displaying the selected object in the three-dimensional virtual space along a display direction from the calculated display position to a position of the selected object when the calculated display position coincides with one of the predetermined positions along the fixed direction while moving along the fixed direction.

17. Virtual object display method for displaying a virtual environment from a display position behind a head of a human model walking in three-dimensional virtual space, comprising the steps of:

calculating a view direction and a viewpoint of the human model according to a present display position and a present reference point of the human model, wherein the present display position is fixedly located behind the head of the human model, wherein the present reference point is located forward of a walking direction, wherein the view direction is a direction from the present display position to the present reference point, and wherein the viewpoint is a center point for rotation of the head of the human model;

displaying the virtual environment along a present display direction from the present display position behind the head of the human model to the present reference point;

inputting a move instruction of the head of the human model, wherein the move instruction includes a rotation angle and a rotation direction of the head of the human model;

calculating a head rotation angle of the human model according to the move instruction;

calculating a next display position and a next reference point, wherein the next display position is determined by rotating the present display position by the head rotation angle based on the viewpoint, and wherein the next reference point is determined by rotating the present reference point by the head rotation angle based on the viewpoint;

rotating the head of the human model according to the head rotation angle and the rotation direction; and displaying the virtual environment along a next display direction from the next display position behind the rotated head of the human model to the next reference point.

18. A computer-readable memory for storing a display method for displaying a virtual environment along a display direction from a display position to a reference point in three-dimensional virtual space, the display position being fixedly located behind a viewpoint of a walking human model relative to a walking direction, the reference point being located forward of the walking direction, the human model consisting of a plurality of body parts in three-dimensional virtual space, comprising:

instruction means for causing a computer to store a set value for each body part, wherein said set value corresponds to a unit sample of the walking motion in three-dimensional virtual space, and wherein one step of the walking motion consists of a plurality of the unit samples;

instruction means for causing a computer to calculate the viewpoint of the human model for each unit sample of the walking motion in order according to a present basis point and the set value for each body part of the human model for the unit sample of the walking motion;

instruction means for causing a computer to calculate the display position corresponding to the the viewpoint of the human model in the three-dimensional virtual space for each unit sample of the walking motion; and instruction means for causing a computer to display the virtual environment in the three-dimensional virtual space along the display direction from the display position to the reference point, wherein the display direction is changed in synchronization with change of the viewpoint of the human model by the unit sample of the walking direction.

19. A computer-readable memory for storing a display method for displaying a virtual object from a display position moving along a fixed direction in three-dimensional virtual space, plurality of virtual objects being previously located surrounding the fixed direction, comprising:

instruction means for causing a computer to store object information of the virtual object viewable from each of predetermined positions along the fixed direction of motion of a viewpoint in the three-dimensional virtual space;

instruction means for causing a computer to calculate the display position for moving in sequence along the fixed direction according to a predetermined speed of the display position;

instruction means for causing a computer to select the virtual object to be viewed from the display position according to a distance between the calculated display position and a position of each stored object to be viewed whenever the calculated display position coincides with one of the predetermined positions along the fixed direction;

instruction means for causing a computer to display the virtual space along the fixed direction from the calculated display position when the calculated display position does not coincide with all of the predetermined positions along the fixed direction while moving along the fixed direction; and instruction means for causing a computer to display the selected object in the three-dimensional virtual space along a display direction from the calculated display position to a position of the selected object when the calculated display position coincides with one of the predetermined positions along the fixed direction while moving along the fixed direction.

20. A computer-readable memory for storing a display method for displaying a virtual environment from a display position behind a head of a human model walking in three-dimensional virtual space, comprising:

instruction means for causing a computer to calculate a view direction and a viewpoint of the human model according to a present display position and a present reference point of the human model, wherein the present display position is fixedly located behind the head of the human model, wherein the present reference point is located forward of a walking direction, wherein the view direction is a direction from the present display position to the present reference point, and wherein the viewpoint is a center point for rotation of the head of the human model;

instruction means for causing a computer to display the virtual environment along a present display direction from the present display position behind the head of the human model to the present reference point;

instruction means for causing a computer to input a move instruction of the head of the human model, wherein the move instruction includes a rotation angle and a rotation direction of the head of the human model;

instruction means for causing a computer to calculate a head rotation angle of the human model according to the move instruction;

instruction means for causing a computer to calculate a next display position and a next reference point, wherein the next display position is determined by rotating the present display position by the head rotation angle based on the viewpoint, and wherein the next reference point is determined by rotating the present reference point by the head rotation angle based on the viewpoint;

instruction means for causing a computer to rotate the head of the human model according to the head rotation angle and the rotation direction; and instruction means for causing a computer to display the virtual environment along a next display direction from the next display position behind the rotated head of the human model to the next reference point.

* * * * *

UNITED STATES PATENT AND TRADEMARK OFFICE
CERTIFICATE OF CORRECTION

PATENT NO. : 6,078,329
DATED : June 20, 2000
INVENTOR(S) : Naoko Umeki et al.

It is certified that error appears in the above-indentified patent and that said Letters Patent is hereby corrected as shown below:

Claim 2, col. 11, line 38, "and-a" should read --and a--.

Claim 8, col. 12, line 37, "three-dimentional" should read --three-dimensional--.

Claim 16, col. 14, line 27, "alone" should read --along--.

Claim 18, col. 15, line 27, before "viewpoint", delete "the" (second occurrence).

Signed and Sealed this

Tenth Day of April, 2001

Attest:

NICHOLAS P. GODICI

*Attesting Officer*        *Acting Director of the United States Patent and Trademark Office*